US009310989B2

(12) United States Patent
Dehmann

(10) Patent No.: US 9,310,989 B2
(45) Date of Patent: Apr. 12, 2016

(54) METHOD AND DEVICE FOR PROVIDING A USER INTERFACE

(75) Inventor: Rainer Dehmann, Berlin (DE)

(73) Assignee: VOLKSWAGEN AG, Wolfsburg (DE)

( * ) Notice: Subject to any disclaimer, the term of this patent is extended or adjusted under 35 U.S.C. 154(b) by 363 days.

(21) Appl. No.: 13/698,380

(22) PCT Filed: Apr. 30, 2011

(86) PCT No.: PCT/EP2011/002161
§ 371 (c)(1),
(2), (4) Date: Nov. 16, 2012

(87) PCT Pub. No.: WO2011/144294
PCT Pub. Date: Nov. 24, 2011

(65) Prior Publication Data
US 2013/0067407 A1 Mar. 14, 2013

(30) Foreign Application Priority Data

May 18, 2010 (DE) .......................... 10 2010 020 895

(51) Int. Cl.
*G06F 3/0485* (2013.01)
*G11B 27/34* (2006.01)
(Continued)

(52) U.S. Cl.
CPC ............ *G06F 3/04855* (2013.01); *B60K 35/00* (2013.01); *B60K 37/06* (2013.01); *G06F 3/04883* (2013.01); *G11B 27/34* (2013.01); *B60K 2350/1004* (2013.01)

(58) Field of Classification Search
CPC ............................ G06F 3/0485; G06F 3/04883
See application file for complete search history.

(56) References Cited

U.S. PATENT DOCUMENTS 6,580,984 B2 * 6/2003 Fecher .................. B60K 35/00
340/438
6,591,168 B2 * 7/2003 Odinak .................. B60K 35/00
280/1

(Continued)

FOREIGN PATENT DOCUMENTS

DE 19732287 A1 1/1999
DE 19941955 A1 3/2001
(Continued)

OTHER PUBLICATIONS

DotNetBar. "Metro User Interface Controls" publically available Oct. 7, 2011. Retrieved from [http://www.devcomponents.com/dotnetbar/metro-ui-controls.aspx] via Internet Archive on [Apr. 5, 2015].*

(Continued)

*Primary Examiner* — Amy M Levy
(74) *Attorney, Agent, or Firm* — Barnes & Thornburg LLP

(57) ABSTRACT

A method for providing a user interface, wherein a real subset of a set having several objects can be displayed by a control device of a display unit, a graphic element is displayed by way of the position of a first graphic sub-element relative to a second graphic sub-element, and the displayed subset is changed by an operating process. Objects are divided into n disjoint subsets, wherein n is a natural number greater than 2 and n positions are defined relative to the second graphic sub-element, and the first graphic sub-element is displayed only for one of these n positions if no operating process for changing the subset is carried out, wherein the positioning of the first graphic sub-element on one of the n positions shows which of the n subsets is currently being displayed.

28 Claims, 11 Drawing Sheets

(51) Int. Cl.
*G06F 3/0488* (2013.01)
*B60K 37/06* (2006.01)
*B60K 35/00* (2006.01)

(56) References Cited

U.S. PATENT DOCUMENTS

| | | | | |
|---|---|---|---|---|
| 6,966,037 | B2* | 11/2005 | Fredriksson et al. | 715/830 |
| 7,605,773 | B2* | 10/2009 | Janssen | B60K 35/00 345/156 |
| 7,848,882 | B2* | 12/2010 | Kawai | B60K 35/00 340/438 |
| 8,205,168 | B1* | 6/2012 | Van Slembrouck | 715/786 |
| 8,675,965 | B2* | 3/2014 | Lieberknecht et al. | 382/190 |
| 8,681,114 | B2* | 3/2014 | Hauschild | B60K 35/00 345/173 |
| 8,818,624 | B2* | 8/2014 | Small | B60K 35/00 701/36 |
| 8,977,982 | B1* | 3/2015 | Amacker | 715/787 |
| 9,019,311 | B2* | 4/2015 | Dehmann | B60K 35/00 345/648 |
| 9,221,342 | B2* | 12/2015 | Dehmann | B60K 37/06 |
| 2002/0063737 | A1 | 5/2002 | Feig et al. | |
| 2002/0186252 | A1* | 12/2002 | Himmel et al. | 345/787 |
| 2006/0184901 | A1* | 8/2006 | Dietz | 715/855 |
| 2007/0143705 | A1* | 6/2007 | Peters | 715/786 |
| 2007/0150830 | A1* | 6/2007 | Ording et al. | 715/784 |
| 2007/0220445 | A1* | 9/2007 | Yach et al. | 715/790 |
| 2008/0082930 | A1* | 4/2008 | Omernick et al. | 715/765 |
| 2008/0126989 | A1 | 5/2008 | Flores et al. | |
| 2008/0309614 | A1 | 12/2008 | Dunton et al. | |
| 2009/0064055 | A1* | 3/2009 | Chaudhri et al. | 715/863 |
| 2010/0011315 | A1* | 1/2010 | Araki | 715/783 |
| 2010/0077353 | A1* | 3/2010 | Moon et al. | 715/832 |
| 2010/0146435 | A1* | 6/2010 | Cros | 715/786 |
| 2010/0251165 | A1 | 9/2010 | Williams | |
| 2010/0302278 | A1* | 12/2010 | Shaffer et al. | 345/659 |
| 2011/0055775 | A1* | 3/2011 | Saito et al. | 715/863 |
| 2013/0042205 | A1* | 2/2013 | Tsuda et al. | 715/811 |

FOREIGN PATENT DOCUMENTS

| | | |
|---|---|---|
| DE | 10036421 A1 | 2/2002 |
| DE | 102007039442 A1 | 2/2009 |
| EP | 1780634 A2 | 5/2007 |
| KR | 1020100046049 | 5/2010 |
| WO | 2007048694 A2 | 5/2007 |
| WO | 2009106917 A1 | 9/2009 |

OTHER PUBLICATIONS

Chen, Hon. "Slider Page Control" publically available Apr. 23, 2011. Retrieved from [http://www.honchen.com/2010/12/SliderPageControl---open-source-alternative-for-UIPageControl-in-IOS] via Internet Archive on [Apr. 5, 2015].*

Gordon, Jen. iPhone App Design Trends. Blog entry posted Oct. 9, 2009 at Smashing Magazine <http://www.smashingmagazine.com> retrieved <Jun. 3, 2015>. 31 pages.*

Kessler, Gaya (Animated tabbed content with jQuery. Blog entry posted Apr. 26, 2009 at <https://blog.gaya.ninja> retrieved <Jun. 3, 2015>. 15 pages.*

Preliminary Report on Patentability for International Patent Application No. PCT/EP2011/002161; Nov. 20, 2012.

Microsoft Corporation; PowerPoint 2003 Help and How-To; downloaded from the Internet; URL: http://web.archive.org/web/20101224190021/http://office.microsoft.com/en-us/powerpoint-help/CL010072915.aspx (Way Back Machine); Nov. 16, 2012 (Dec. 2010).

Search Report for German Patent Application No. 10 2010 020 895.7; Apr. 27, 2011.

Search Report for International Patent Application No. PCT/EP2011/002161; Sep. 30, 2011.

Office Action for Korean Patent Application No. 10-2012-7032546; Sep. 24, 2014.

Apple Inc.; iPod Touch User Guide; p. 17; Sep. 2008.

Office Action for Chinese Patent Application No. 201180035185.4; May 12, 2015.

* cited by examiner

METHOD AND DEVICE FOR PROVIDING A USER INTERFACE

PRIORITY CLAIM

This patent application is a U.S. National Phase of International Patent Application No. PCT/EP2011/002161, filed 30 Apr. 2011, which claims priority to German Patent Application No. 10 2010 020 895.7, filed 18 May 2010, the disclosures of which are incorporated herein by reference in their entirety.

FIELD

Disclosed embodiments relate to a method for providing a user interface, in which a genuine subset of a set having a large number of objects can be displayed by means of a control apparatus by a display device. The method involves a graphical object being displayed which is used to present which subset is currently displayed by virtue of the relative position of a first graphical subelement in relation to a second graphical subelement. In addition, the method involves an operator control process being used to alter the displayed subset. Furthermore, disclosed embodiments relate to an apparatus for providing a user interface having a display device and a control apparatus for controlling the display on the display device. The control apparatus can be used to display a genuine subset of a set having a large number of objects. In addition, a graphical element can be displayed which is used to present which subset is currently displayed by virtue of the relative position of a first graphical subelement in relation to a second graphical subelement. Furthermore, the apparatus comprises an input device which can be used to perform an operator control process which alters the displayed subset.

BACKGROUND

The method and the apparatus disclosed herein are used particularly in a vehicle, e.g. in a motor vehicle. The method and the apparatus are not limited to this use, however. On the contrary, the apparatus and the method can be employed in arbitrary appliances, particularly portable appliances, such as a music player, a mobile telephone or a mobile navigation system.

A motor vehicle contains various information and communication areas which have associated display instruments. These are used to inform the driver and passengers. In addition, they can assist the driver in navigation or in communication with the outside world. The display can visually present traffic-related or operational-related data, in particular, from the vehicle. Arranged in proximity to the primary field of vision of the driver is what is known as the combined instrument. Usually, this is in the cockpit behind the steering wheel, where it can be seen through an opening in the steering wheel. It is used particularly to display the speed, the tank content, the radiator temperature and other operation-related information from the motor vehicle. In addition, radio and audio functions can be presented. Finally, menus for telephone, navigation, telematics services and multimedia applications can be displayed. The display used is usually liquid-crystal displays in various disclosed embodiments.

As a further display device, a vehicle frequently has a multifunctional display in the central console or above the central console, which has an associated operator control element. Such a multifunctional operator control element is described in DE 199 41 955 A1, for example.

In order to present the many and diverse operator-control and display options clearly, hierarchic menu structures are frequently used. A menu displays various menu items and possibly graphics or icons associated with the menu items. When a menu item is selected, a submenu having further submenu items opens. This structure can be continued over a plurality of hierarchy levels. Furthermore, instead of a submenu, a menu item may have an associated particular display image which presents the information associated with the menu item.

Very specific demands on the structure of the display arise for the display of information in a motor vehicle. The reason is that the information needs to be displayed such that the information can also be assimilated easily and intuitively by the driver of the motor vehicle. In particular, the assimilation of information by the driver should not result in distraction during the trip.

DE 10 2007 039 442 A1 discloses a method for displaying information in a motor vehicle in which graphical objects are presented in an arrangement on a virtual ring presented in perspective and in which an input by a user prompts the graphics data to be altered such that the objects rotate on the virtual ring in the manner of a carousel.

When a user interface is intended to be made available in combination with an appliance which comprises a relatively small display panel, the problem arises that it is not possible to present graphical symbols for every object on the display panels in the case of a set having a large number of objects. In such a case, only a subset of such a set forming a list is, therefore, displayed. The user can produce scrolling in the list by means of an operator control process. So that the user can orient himself better within the total set or the list, it is known practice to additionally display a graphical element which visually displays what is currently displayed for a subset within the total set. Such a graphical element is a scrollbar, for example, in which a strip or a bar represents the total set and a marker firstly visually displays a position of the currently displayed subset within the total set and secondly visually displays the size of the displayed subset relative to the total set. Such a scrollbar may also be in the form of a button, with the result that the user can select the subset to be displayed using the scrollbar by virtue of cursor control or by means of a touch-sensitive surface on the display panel.

A conventional scrollbar admittedly allows the subset that is to be displayed to be selected arbitrarily within an ordered subset of objects. However, when the method or the apparatus is used in an environment in which it is important for an operator control process to be able to be performed quickly and for the operator control process to demand as little attentiveness from the user as possible, it is desirable for the method or the apparatus to be matched to these conditions. Particularly in the case of use in a vehicle, the method or the apparatus should be matched to the specific requirements for this use.

SUMMARY

Disclosed embodiments provide a method and an apparatus of the type cited at the outset which firstly allow the displayed subset to be altered quickly and intuitively and secondly simplify orientation within the total set.

BRIEF DESCRIPTION OF THE DRAWINGS

Disclosed embodiments are explained below with reference to the drawings.

DETAILED DESCRIPTION OF THE DISCLOSED EMBODIMENTS

Figure 1:
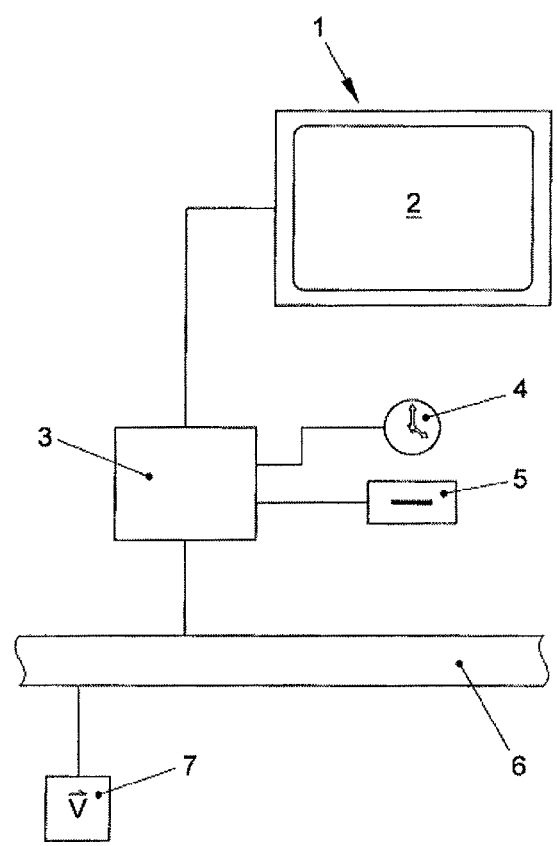
FIG. 1 schematically shows the design of a disclosed embodiment of the apparatus for displaying information.

Disclosed embodiments provide a method wherein the objects are divided into n disjunct subsets, where n is a natural number which is greater than 2. In addition, n positions are defined relative to the second graphical subelement. The first graphical subelement is displayed only at one of these n positions if no operator control process for altering the subset is performed. The positioning of the first graphical subelement on one of the n positions then presents which of the n subset is currently displayed.

In terms of function, the graphical element having the two graphical subelements, therefore, corresponds to a conventional scrollbar. However, the scrollbar is divided into n positions, which correspond to the n disjunct subsets of the total set of objects. The total set is, therefore, permanently divided into n subsets. This division cannot be altered by scrolling. An operator control process can only stipulate which of the n subsets is intended to be displayed. According to the displayed subsets, the first graphical subelement is presented on one of the n positions of the second graphical subelement.

The permanent division into n disjunct subsets which is provided by the method allows the user to quickly select one of the desired subsets by virtue of an operator control process without the need for fine adjustment in order to present the desired subset, as is performed with a conventional scrollbar. Furthermore, the observer can quickly grasp which subset is currently displayed by virtue of the graduated positioning of the first graphical subelement relative to the second graphical subelement.

According to at least one disclosed embodiment of the method, the first graphical subelement can be displaced essentially smoothly relative to the second graphical subelement by an operator control process by means of an input apparatus. At the outside, any stages result from the resolution for the display of the graphical subelement, but not from the stipulation of the n positions of the first graphical subelement relative to the second graphical subelement. Following the conclusion of the operator control process this refinement of the method involves the first graphical subelement being automatically displayed on a particular position from the n positions on the basis of the position of the first graphical subelement at the conclusion of the operator control process. The first graphical subelement can, therefore, be displaced smoothly as in the case of a conventional scrollbar. However, the position of this graphical subelement does not remain in the position at the conclusion of the operator control process, but rather is transferred to one of the n positions relative to the second graphical subelement. This transition following the conclusion of the operator control process does not take place abruptly, however, but rather by means of an animation which provides a fluent visual transition.

The smooth displacability of the first graphical subelement provides very intuitive and simple operator control when altering the subset to be displayed. In contrast to the operator control of a conventional scrollbar, however, it is not necessary for the user to position the first graphical subelement exactly in order to display the desired subset, since positioning in a particular area is sufficient for the first graphical subelement to be automatically transferred to one of the n positions relative to the second graphical subelement and hence for the desired subset to be displayed. This simplification of the operator control process is advantageous particularly when the method is used in environments which require fast operator control in which the attentiveness of the user is demanded as little as possible, as is the case for use in a motor vehicle, for example.

The extent of the first graphical subelement relative to the second graphical subelement in at least one direction presents the number of objects in the currently displayed subset relative to the total number of objects in the set. In this way, the user can quickly and intuitively grasp how many of the objects from the total set are currently displayed.

According to another disclosed embodiment of the method, the second graphical subelement is divided into n segments. The segments are of equal size, in particular. By way of example, they are displayed at intervals from one another. The extent of the first graphical subelement corresponds particularly to the extent of a segment of the second graphical subelement. Hence, both the size of a segment and the size of the first graphical subelement visually display the size of the displayed subset relative to the total set. The n positions of the second graphical subelement are chosen particularly such that at each of these positions the first graphical subelement is presented at one of the n positions in a form superimposed on a segment. However, the first graphical subelement can be presented so as to be distinguishable from the segment by virtue of the color, the transparency or the area fill.

According to yet another disclosed embodiment of the method, the n segments are in the form of buttons. Operation of the buttons allows selection of the subset of the objects that is to be displayed. An alteration in the subset as a result of selection of a segment of the second graphical subelement prompts the performance of an animation in which the first graphical subelement is moved to the relevant position from the n positions on the display panel. In addition, the first graphical subelement may also be in the form of a button, with the result that it can be displaced by virtue of cursor control or by means of a touch-sensitive surface on the display panel, for example.

The method is used in a vehicle, in particular. In this case, the speed of the vehicle is measured. The method can now be matched to the operation of the vehicle by matching the movement of the graphical objects on the display panel during the animations in the method to the speed of the vehicle by means of the control apparatus. In the case of the method, the movement of the graphical objects can, therefore, be matched specifically to the situations in which the vehicle is operated.

Disclosed embodiments provide an apparatus wherein the objects are divided into n disjunct subsets, where n is a natural number which is greater than 2. In the case of the apparatus, the control apparatus actuates the display device such that n positions are defined relative to the second graphical subelement, and that the first graphical subelement can be displayed only at one of these n positions if no operator control process for altering the subset is performed, wherein the positioning of the first graphical subelement on one of the n positions presents which of the n subsets is currently displayed.

The apparatus is designed particularly such that it can perform the method described above wholly or in part. The apparatus, therefore, also has the same advantages as the aforementioned method.

In the apparatus, the input device comprises particularly a touch-sensitive surface on the display panel.

Furthermore, disclosed embodiments provide a vehicle having such an apparatus.

The apparatus for displaying information comprises a display device 1 having a display panel 2. The display panel 2 can be provided by a display, particularly a liquid-crystal display, of arbitrary design. In addition, the display device 1 may be a projection device, such as a head-up or head-down display in a vehicle.

The display device 1 is coupled to a control apparatus 3 for the purpose of data interchange. The control apparatus 3 produces graphics data for presenting information on the display panel 2. The control apparatus 3 is able to produce not only static display images but also, in particular, animations, which visually display transitions between various display modes by virtue of movement of graphical objects. In addition, the animations may relate to movements by individual graphical objects in a particular display mode or to the movement of a graphical object from a first presentation in a display mode to a second presentation. In particular, the animations may be what are known as key image animations, in which the frames between two key images of an animation are produced in order to give the impression of a fluid alteration. The images produced between the key images are also called in-betweens and the production of the key image animation is called tweening. For the purpose of producing graphics data and for the purpose of performing the animations, the control apparatus 3 is coupled to a memory 5 and to a system clock 4 for the purpose of data interchange.

Furthermore, an input device is provided. In particular, the input device may comprise a touch-sensitive surface which is provided separately from the display panel 2, with the result that what is known as a touchpad is formed, or which is provided on the display panel 2, with the result that what is known as a touchscreen is provided. Furthermore, the input device, which comprises the touchpad or the touchscreen, may comprise an approach sensing apparatus which senses the approach of an operating element, such as particularly the fingertip of a user, to the touch-sensitive surface. The approach of such an operating element to the touch-sensitive surface can be taken as a basis for altering the information displayed.

Furthermore, the input device may be an inherently known device for sensing and evaluating a gesture by a body part of a user. By way of example, the hand of a user can perform a gesture in front of the display panel 2. The three-dimensional position of the hand in a particular locale in front of the display panel 2 is sensed and is interpreted as an input. In this case, it is not necessary for the user to touch the display panel 2.

Finally, the input device used may be a remote operator control element, particularly a mechanical operator control element. The mechanical operator control element may be a rotary controller or an inherently known rotary push controller. This operator control element can be used to actuate, alter and select graphical objects which are displayed on the display panel 2.

In addition, the control apparatus 3 is connected to further devices which transmit data for the display on the display panel 2 to the control apparatus 3. In the disclosed embodiment shown in FIG. 1, the apparatus is used in a vehicle, particularly a motor vehicle. In this case, the control apparatus 3 is connected to a data bus 6 in the vehicle. The data bus 6 is in turn coupled to many and diverse devices in the vehicle, particularly to a measuring apparatus 7 for measuring the speed of the vehicle. The current vehicle speed can, therefore, be transmitted to the control apparatus 3 by the measuring apparatus 7 via the data bus 6.

The text below explains a first disclosed embodiment of the method which can be performed by the apparatus described with reference to FIG. 1. In this case, the apparatus or the method is used in a vehicle.

Figure 2:
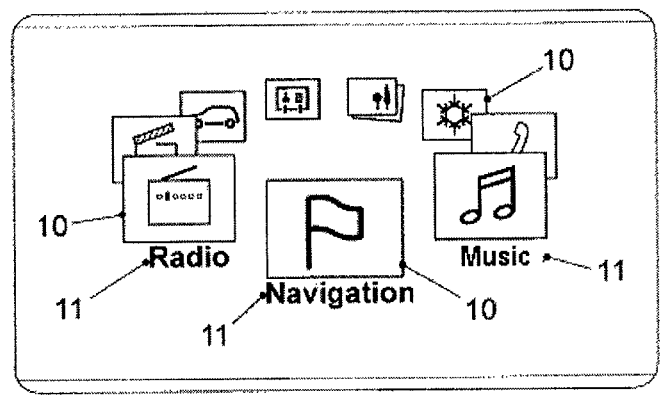
FIGS. 2-9 show presentations on a display panel which are produced by the method in accordance with a first disclosed embodiment.

In the case of the method, the information are displayed in a hierarchic structure. The starting point for this hierarchic structure is the reproduction on the display panel 2 that is shown in FIG. 2. A plurality of graphical objects 10 are presented in an arrangement on a virtual ring presented in perspective. The perspective presentation shows the virtual ring as though the observer is looking onto the ring obliquely from above. In this case, a graphical object 10 in the foreground is presented largest in the perspective presentation. Toward the rear, further graphical objects 10 are presented, with partial concealment by objects 10 situated in front of them. Overall, nine or more graphical objects 10 are displayed in the disclosed embodiment.

The graphical objects 10 are in the form of buttons, so that they can be marked or selected by the user by means of the input device. Within the context of the disclosed embodiments, a button is understood to mean a control element for a graphical user interface. A button differs from elements and panels for the pure display of information, what are known as display elements and display panels, in that they are selectable. When a button is selected, a function associated therewith is performed. The function can merely result in the information display being altered. In addition, the buttons can also be used to control devices for which the operator control is assisted by the information display. The buttons can, therefore, replace conventional mechanical switches. The buttons can be produced and displayed arbitrarily on a user-programmable display panel 2. Furthermore, provision may be made for a button to be able to be marked. In this case, the associated function is not yet performed. The marked button is presented in highlight in comparison with other buttons, however. A button can be marked and/or selected by means of cursor control or by virtue of direct operator control of a touch-sensitive display panel.

The graphical objects 10 comprise symbols which provide the user with advice of the function of the object. In addition, at least some graphical objects 10 may have labels 11 which explain the function again alphanumerically. When the objects 10 are presented on the ring shown in perspective, labels 11 for the objects 10 presented in the foreground are rendered, in particular.

Figure 3:
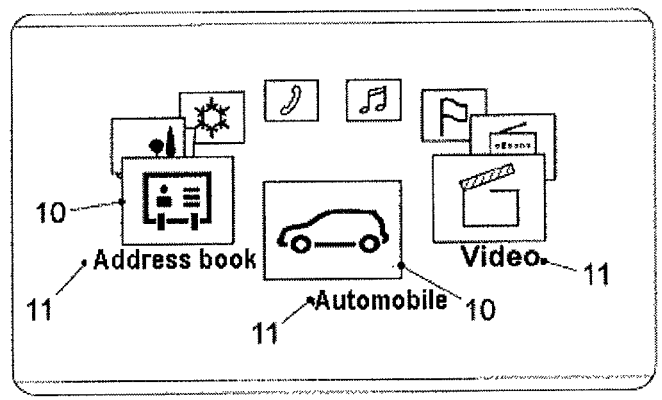

The user can use the input device to rotate the objects 10 on the ring presented in perspective in the manner of a carousel. By way of example, the user can use the input device to bring arbitrary graphical objects 10 into the foreground and to select them. By way of example, FIG. 2 shows a graphical object 10 in the foreground that is associated with the navigation system of a vehicle, and FIG. 3 shows a graphical object 10 in the foreground that is associated with various displays of operating parameters for the vehicle. Details regarding the display and control of the graphical objects 10 in the display mode which are shown in FIGS. 2 and 3 are described in DE 10 2007 039 442 A1.

In the case of the method, the graphical objects 11 are not only able to be presented in the first display mode shown in FIGS. 2 and 3, however. A second display mode is defined, in which the same graphical objects 10 are displayed in another way, i.e. in another layout. The reason is that it has been found that the display on the ring presented in perspective in the first display mode is difficult for the driver to grasp and operate while in transit in the vehicle when more than eight graphical objects 10 are presented. For this reason, the method involves the display mode being selected automatically on the basis of the vehicle speed. If the vehicle is moving in a first speed range, the graphical objects 10 are displayed in the first display mode. If the vehicle is moving in another, second speed range, the graphical objects 10 are presented in the second display mode, described later. The two speed ranges adjoin one another, with a limit speed being defined. If a vehicle exceeds or drops below this limit speed, there is automatically a change from one display mode to the other display mode. By way of example, the limit speed is in a range from 4 km/h to 20 km/h, particularly in a range from 5 km/h to 10 km/h and preferably in a range from 5 km/h to 8 km/h. In the disclosed embodiment, a limit value for the speed of 6 km/h has been chosen.

The transition from one display mode to the other display mode may also be subject to a hysteresis, which may be in a range from 2 km/h to 5 km/h, for example. If a hysteresis of 2 km/h is defined for a limit speed of 6 km/h, for example, then the display mode changes when the vehicle speed exceeds 8 km/h. When the speed is then reduced again, the display mode does not change again until the speed has dropped below 4 km/h, however. When the vehicle speed then rises again, the display mode is again changed only at a speed of 8 km/h. Hence, two limit speeds above and below the average limit speed are defined for the hysteresis.

The vehicle speed is transmitted continually from the measuring apparatus 7 to the control apparatus 3. When the vehicle exceeds or drops below the limit value for the vehicle speed, the control apparatus 3 produces an animation for the transition from one display mode to the other display mode. The display on the display panel 2, therefore, does not alter abruptly, but rather in a fluent transition, so that the user retains his orientation in the hierarchic display structure.

The text below makes reference to FIGS. 3 to 9 to explain the transition from the first display mode shown in FIG. 3 to the second display mode shown in FIG. 9:

The display shown in FIG. 3 is reproduced on the display panel 2 in the vehicle when stationary. The driver now sets the vehicle in motion and exceeds the limit speed for the transition from the first display mode to the second display mode. This exceeding of the limit speed is sensed by the control apparatus 3 on the basis of the data from the measuring apparatus 7. The control apparatus 3 then produces an animation, i.e. a movement by the graphical objects 10, as shown in FIGS. 4 to 9.

Figure 4:
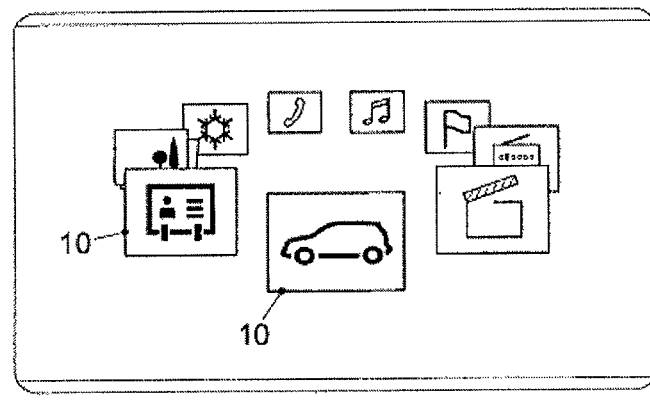
Figure 5:
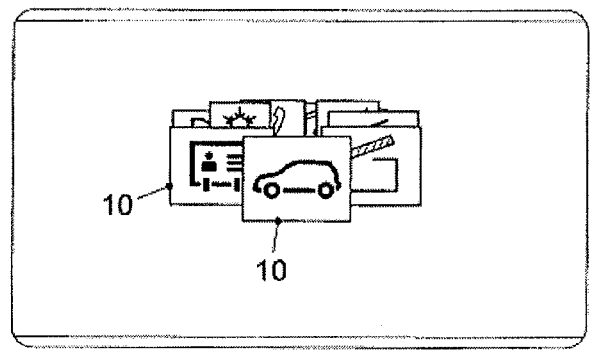
Figure 6:
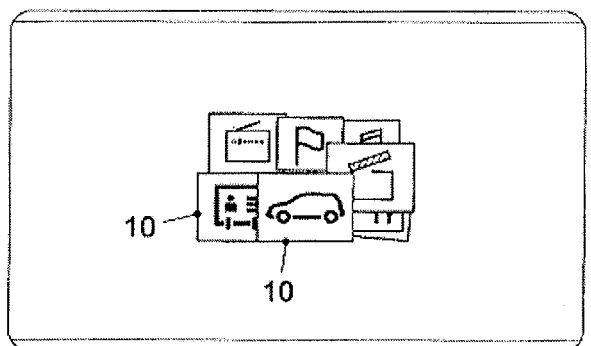
Figure 7:
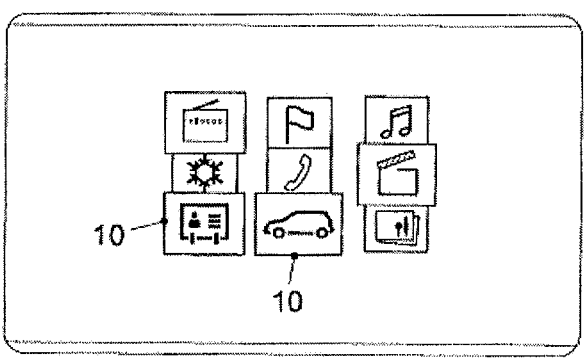
Figure 8:
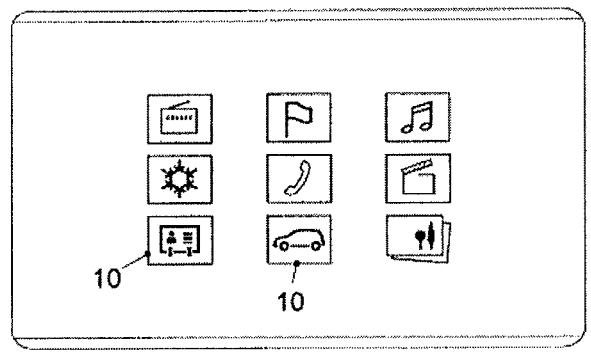

First of all, the labels 11 of the three graphical elements 10 shown in the foreground (FIG. 4) disappear. The graphical objects 10 then move toward one another, as shown in FIGS. 4 and 5, until they combine in a central area of the display panel 2. At the end of this combination, a blank display can possibly be briefly rendered on the display panel 2. The graphical objects 10 are then presented again. They now move away from one another in the direction of the positions for presentation in the second display mode. The expansion of the graphical objects 10 is shown in FIGS. 6 to 9. In this context, FIG. 9 shows the final state of the display in the second display mode.

In the second display mode, the graphical objects 10 are presented beside one another, without overlap in a grid. In this case, each graphical object has an associated fixed position in the grid irrespective of the selection of one of the graphical objects. When the movement of the graphical objects 10 to the grid presentation has ended, labels 11 are finally displayed for all the graphical objects 10.

In the second display mode, the driver of the vehicle can very quickly grasp all the graphical objects 10. In order to select a particular object 10, very little attentiveness is, therefore, demanded of the driver, which means that he is not distracted from what is happening in his driving by the selection of a graphical object 10. Fast and intuitive assimilation of the information as presented in the second display mode is assisted by virtue of all the graphical objects 10 being presented without overlap in the same size. In addition, the user can very easily orient himself in the grid presentation, since the various graphical objects 10 have a fixed place in the grid, which the user can remember after repeated use.

When the vehicle subsequently drops below the limit speed again, possibly taking account of the hysteresis, the control apparatus 3 produces a reverse animation from the second display mode to the first display mode. This involves the graphical objects 10 being moved toward one another from the grid presentation shown in FIG. 9 until they combine in a central area, and then being expanded again in the direction of the positions on the ring as shown in FIG. 2 or 3. In the case of this reverse animation too, the labels 10 are hidden and are shown again in a final state. If an object 10 was marked in the grid presentation, this object 10 is presented in the foreground in the presentation of a ring in the first display mode.

With reference to FIGS. 9 to 12, disclosed embodiments of the method are explained which can also be performed by the apparatus described with reference to FIG. 1. In this case, the use of the apparatus or of the method is not limited to a vehicle. The apparatus and the method can be used in arbitrary appliances, particularly in portable appliances, such as a music player, a mobile telephone or a mobile navigation system. It goes without saying that use in the vehicle is also possible.

Figure 9:
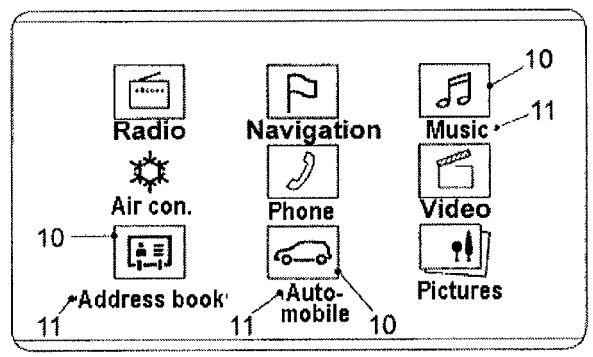
Figure 10:
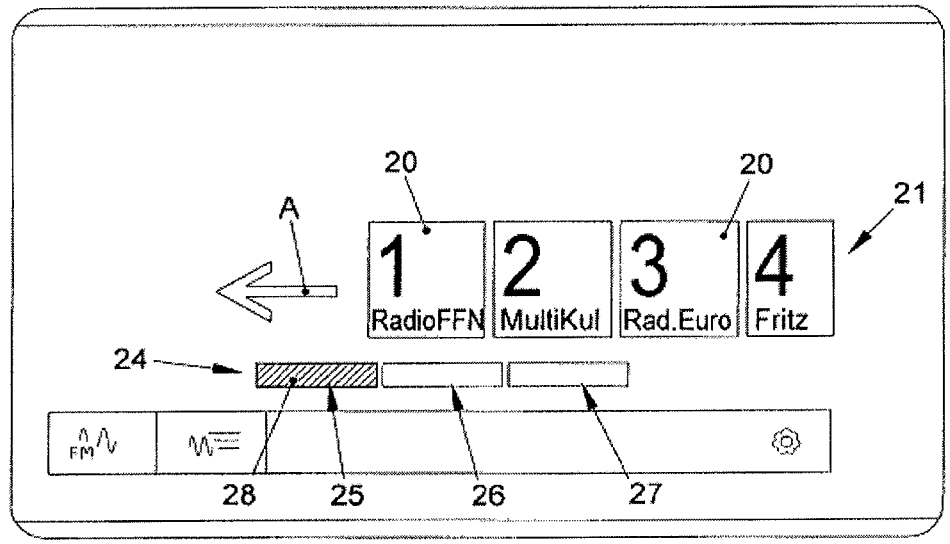
FIGS. 10-24 show presentations on a display panel which are produced by the method in accordance with a second and a third disclosed embodiment.
Figure 11:
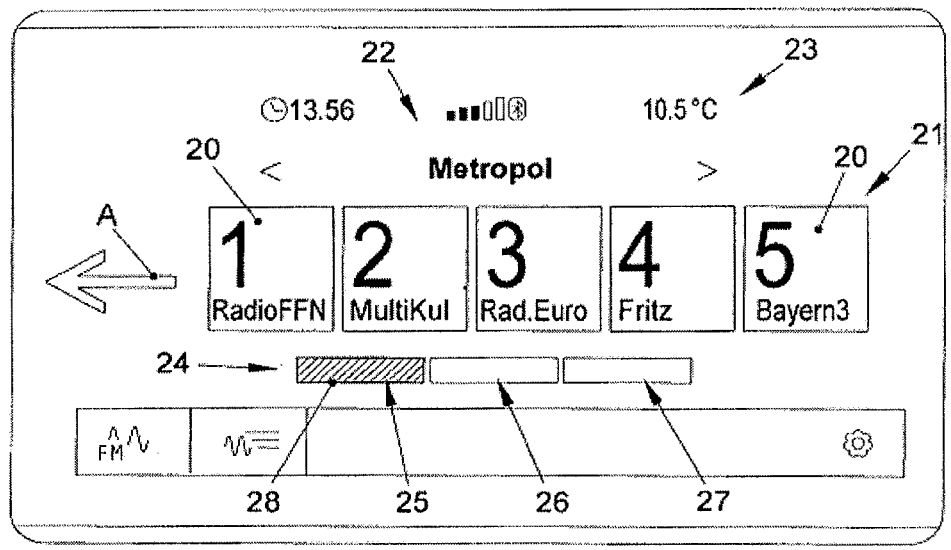

Another disclosed embodiment of the method relates to the transition from a first presentation on the display panel 2 to a second presentation on the display panel 2. The first presentation may be the display in the first or the second display mode, as shown in FIGS. 2, 3 and 9. By way of example, the second presentation relates to the context of a graphical object 10. The second presentation is displayed by a user by means of the input device particularly after selection of a graphical object 10. In this case, another information content and not just an altered layout is, therefore, displayed. In this case too, an abrupt change of the display on the display panel 2 is not brought about, however, but rather a fluent transition from the first presentation to the second presentation, as explained below:

If, on the basis of the display as shown in FIG. 9, for example, the user selects the graphical object 10 with the label "radio", the control apparatus 3 produces an animation in which the graphical objects 10 are moved outward away from one another. Briefly, a blank display is reproduced on the display panel 2. Various other graphical objects 20 from the second presentation on the display panel 2 are then moved toward their final position. An important feature of the second disclosed embodiment of the method is the movement of the newly displayed graphical objects 20, particularly the movement of a main object which serves as an eye catcher for the user during this transition.

Figure 12:
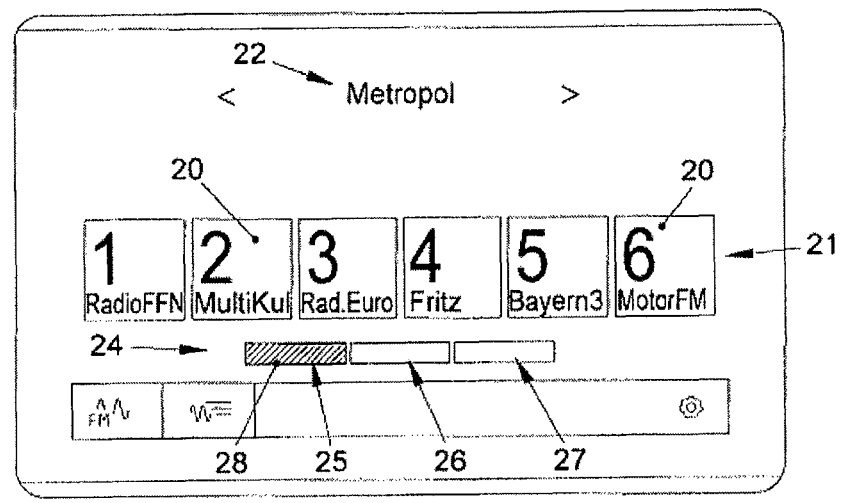
Figure 13:
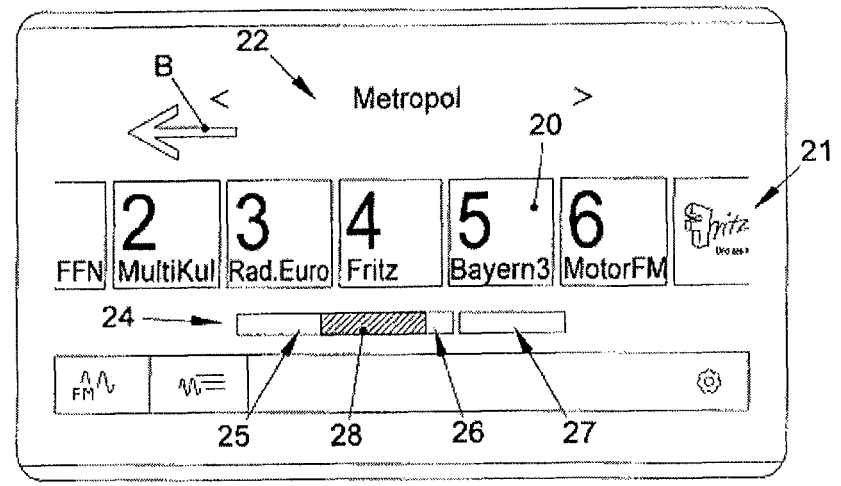
Figure 14:
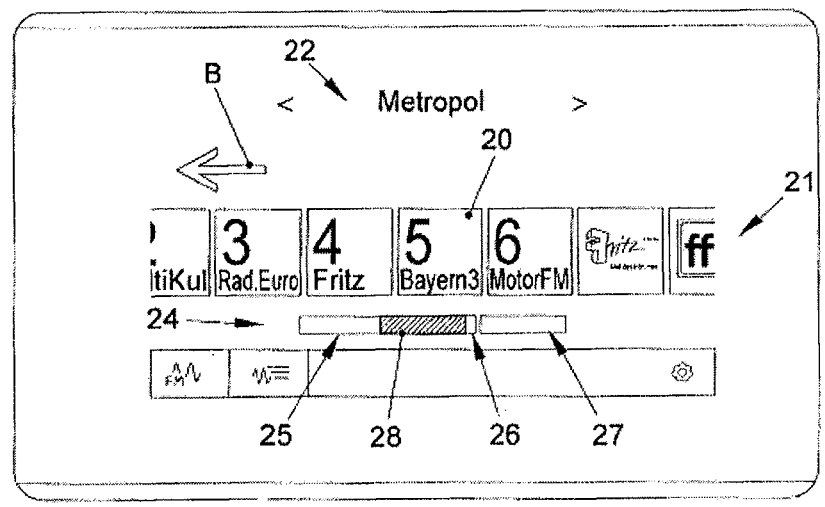
Figure 15:
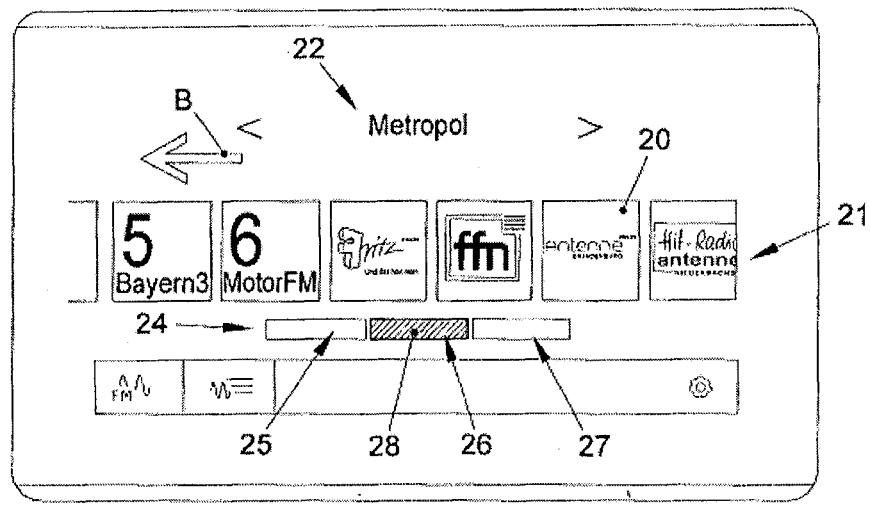
Figure 16:
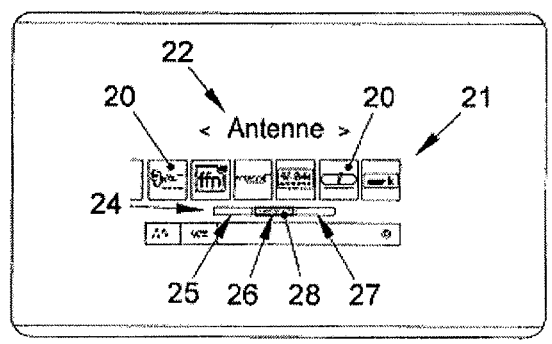
Figure 17:
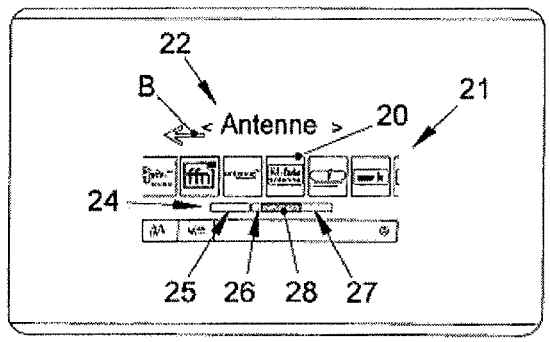
Figure 18:
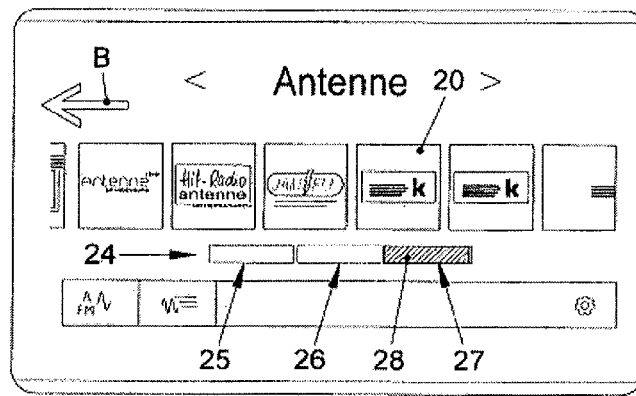
Figure 19:
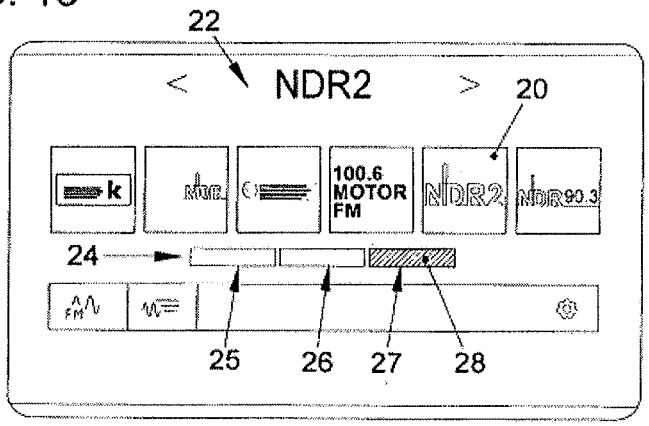

In the transition described in this disclosed embodiment, a strip 21 is moved into the display panel 2 for the radio function. This strip 21 contains a plurality of graphical objects 20 which represent individual radio stations. The strip 21 is moved in a particular movement pattern for this transition on the display panel 2. In the disclosed embodiment described here, the strip 21 with the graphical objects 20 is moved from right to left in the direction of arrow A. There then appear ever more graphical objects 20 until in the final state, as shown in FIG. 12, a total of six graphical objects 20 are presented on the strip 21. Furthermore, further display elements or buttons 22, 23 and 24 are shown as the strip 21 moves.

The movement pattern which the strip 21 performs is distinguished in that it corresponds to a movement pattern which is performed in the second presentation when one of the graphical objects 20 is operated for an input using the input device in the second presentation.

By way of example, the user can, in order to display further graphical objects 20 for other radio stations, move the graphical objects 20 on the strip 21. In this case, the graphical objects 20 are also moved in the direction of arrow A or in the opposite direction. For the transmission from the first presentation to the second presentation, the movement of the strip 21 with the graphical objects 20, therefore, already conveys to the observer how the graphical objects 20 can be moved in the second presentation. The type of transition is, therefore, simultaneously used as an instruction manual for operating graphical objects 20 in a list in the second type of presentation.

As shown in FIGS. 13 to 19, the reason is that the user can move the graphical objects 20, for example with a wiping gesture, in the direction of arrow B in order to displace the graphical objects 20 to the left and to display other graphical elements 20 for other radio stations. In the present case, the list with the radio stations contains a total of eighteen list entries, each of which has an associated graphical object 20. By means of a wiping gesture in the direction of arrow B or in the opposite direction, the user can alter the display of the list entries as appropriate. The movement pattern of this movement in the direction of arrow B or in the opposite direction then corresponds to the movement pattern in the direction of arrow A for the transition to the presentation of the graphical objects 20 for the radio stations. If the list entries are altered in another movement pattern, for example in a swivel or rotary movement, the transition to the second type of presentation with the radio stations would also take place such that the list with the graphical objects 20 is moved in on the display panel 2 in a swivel or rotary movement.

Finally, with reference to FIGS. 12 to 24, a third disclosed embodiment of the method is explained which can also be performed by the apparatus described with reference to FIG. 1. This third disclosed embodiment is also independent of use in the vehicle. In particular, it can also be used in portable appliances.

As explained above, a total of eighteen graphical objects 20 which represent various radio stations can be presented on the display panel 2. However, the display panel 2 is not large enough to present all eighteen objects 20 simultaneously. Therefore, the display panel 2 always displays only a genuine subset of the total set of graphical objects 20. The displayed subset can be altered by an operator control process which is performed by means of the input device. The third disclosed embodiment of the method relates to a method for providing a user interface in which the displayed subset of the objects 20 can be altered and the user is provided with a visual display of which subset within the total set is currently displayed.

When a display panel 2 displays only a subset from a set having a multiplicity of objects, what is known as a scrollbar is conventionally displayed to the observer as a graphical element. Such a scrollbar comprises two graphical subelements: firstly a strip is displayed, the length of which represents the magnitude of the total set, and secondly a marker on the strip is displayed, the length of which represents the magnitude of the displayed subset and the position of which relative to the strip provides the observer with a visual display of where the displayed subset is situated within the total set. In this case, the displayed set is, therefore, particularly subject to a particular order.

In the case of the method based on the third disclosed embodiment, the user interface and the type of visual display are modified as follows:

The graphical objects 20 are divided into n disjunct subsets. In this case, n is a natural number which is greater than 2. In the disclosed embodiment described here, the total set of graphical objects 20 comprises a total of eighteen objects 20. This total set is divided into three disjunct subsets: The first subset comprises the graphical objects 20 Nos. 1 to 6, the second subset comprises the graphical objects 20 Nos. 7 to 12 and the third subset comprises the graphical objects 20 Nos. 13 to 18.

As FIG. 12 shows, a graphical element which is divided into two subelements is situated beneath the display of the graphical objects 20 for the radio stations. The first graphical subelement is a modified strip 24. The strip 24 is in turn divided into a total of n segments which are arranged at intervals from one another. In the present case, the three segments 25, 26 and 27 are, therefore, displayed.

Furthermore, the second graphical subelement displayed is a marker 28. If no operator control process for altering the subset of graphical objects 20 that is to be displayed is being performed, the marker 28 is always displayed congruently with one of the segments 25, 26 or 27. If the marker 28 is displayed on the segment 25 then the observer is provided with a visual display indicating that the graphical objects 20 for the first six radio stations are displayed, if the marker 28 is displayed on the segment 26 then the observer is provided with a visual display indicating that the graphical objects 20 for the second six radio stations are displayed, and if the marker 28 is displayed on the segment 27 then the observer is provided with a visual display indicating that the graphical objects 20 for the third six radio stations are displayed.

The user can alter the displayed subset by means of an operator control process. If the input device comprises a touch-sensitive surface on the display panel 2, for example, then the subset can be altered by a wiping gesture. On the basis of the display shown in FIG. 12, the user can use his fingertip, for example, to touch the strip 21 with the graphical objects 20 and, as shown in FIGS. 13 to 19, can move the fingertip in the direction of arrow B. This movement of the fingertip on the touch-sensitive surface on the display panel 2 is sensed by the control apparatus 3, and the control apparatus 3 then accordingly alters the display reproduced on the display panel 2. The reason is that the movement of the fingertip displaces the graphical objects 20 essentially smoothly in the direction of arrow B. Accordingly, the marker 28 on the strip 24 is displaced smoothly in the opposite direction, with the result that the marker 28 always shows the observer which subsets or which section of the strip 21 with the graphical objects 20 is/are currently displayed.

Instead of moving the finger in the region of the strip 21 in the direction of arrow B, the user could also touch the display panel 2 in the area of the marker 28 and move the fingertip accordingly in the other direction in order to alter the displayed subset with the graphical objects 20 on the strip 21 and at the same time to displace the marker 28 on the strip 24 essentially smoothly.

Following the conclusion of the operator control process, the marker 28 is—in contrast to a conventional scrollbar—automatically moved onto one of the segments 25, 26 or 27 on the basis of the position of the marker 28 relative to the segments 25 to 27 of the strip 24. The marker 28 is moved particularly onto the segment 25, 26 or 27 which provided the greatest coverage upon conclusion of the operator control process. Accordingly, the subset with the graphical objects 20 is displaced such that the first subset is displayed when the marker 28 is on the segment 25, the second subset is displayed when the marker 28 is on the segment 26, and the third subset is displayed when the marker 28 is on the segment 27. When the operator control process is concluded, the marker 28 does not skip to the relevant segment 25, 26 or 27, for example. Instead, an animation, particularly a restrained movement, for the marker 28 to the position is performed. Equally, the positions of the graphical objects 20 are moved until the appropriate subset is displayed.

In the case of the method, the displayable subsets are, therefore, stipulated in advance. They are not freely selectable by means of the operator control process by the user. In the present case, it is not possible to present the graphical objects 20 for radio stations Nos. 3 to 8 simultaneously after the operator control process has concluded, for example.

Instead of a wiping gesture, the user can also tap on a particular segment 25, 26 or 27 of the strip 24 in order to alter the subset. The segments 25 to 27 and also the marker 28 are, therefore, in the form of what are known as buttons which the user can operate by means of the input device.

The extent of the marker 28, i.e. in the present case particularly the length of the marker 28, relative to the extent or length of the segments 25, 26 and 27 is intuitively recognizable to the observer as the number of graphical objects 20 in the currently displayed subset relative to the total number of graphical objects in the set. In order to be able to distinguish the marker 28 from the segments 25 to 27, the marker 28 can be presented in a different color, a different transparency or with a different area fill, for example.

Figure 20:
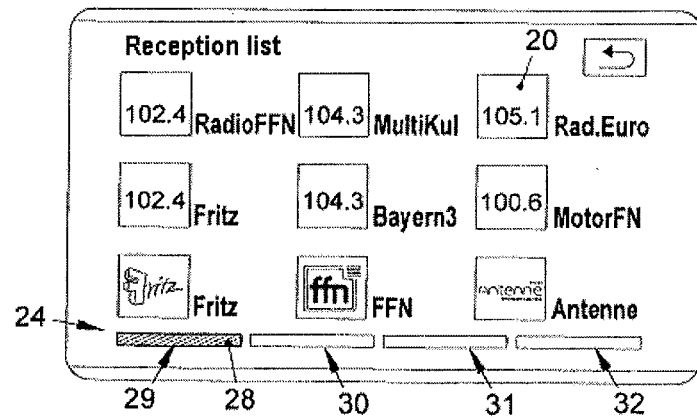
Figure 21:
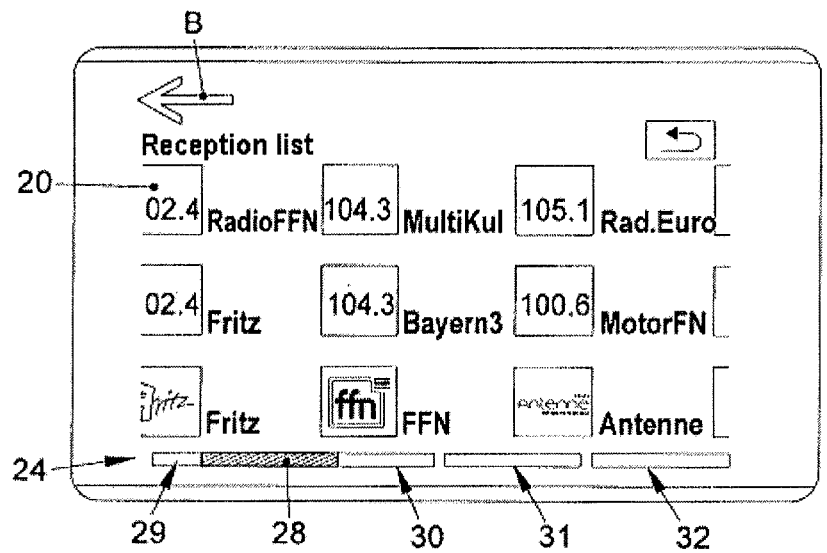
Figure 22:
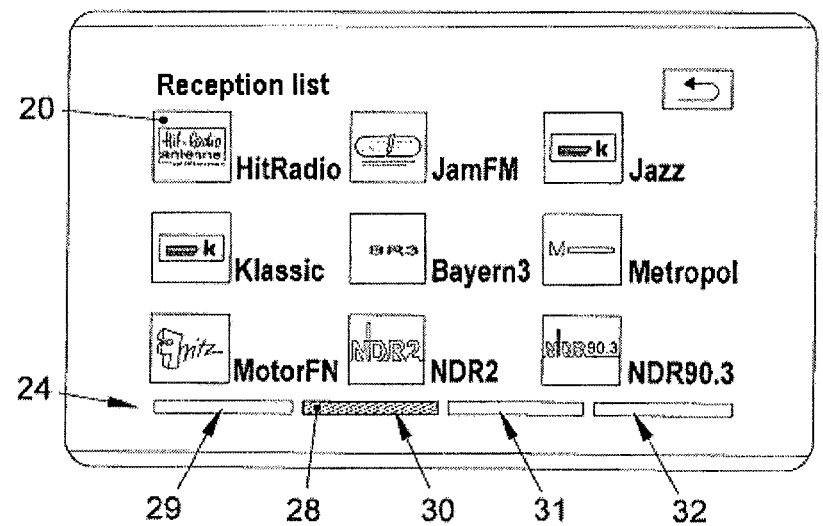
Figure 23:
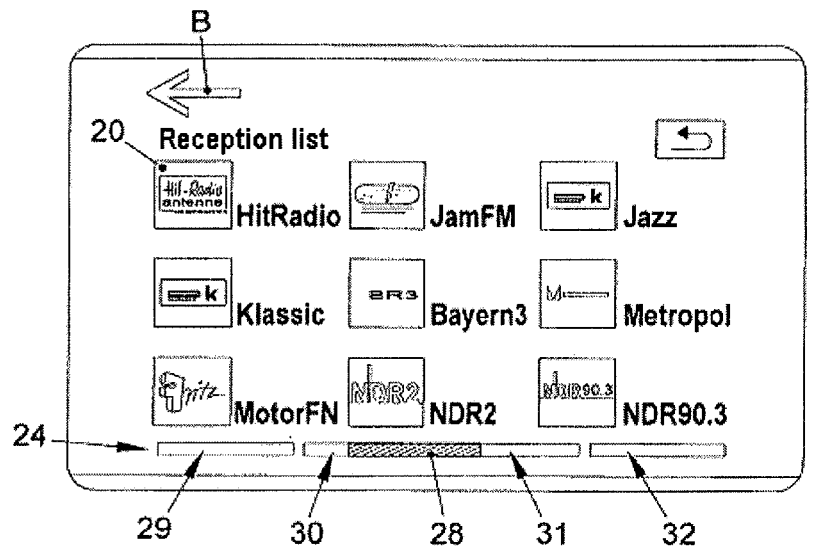
Figure 24:
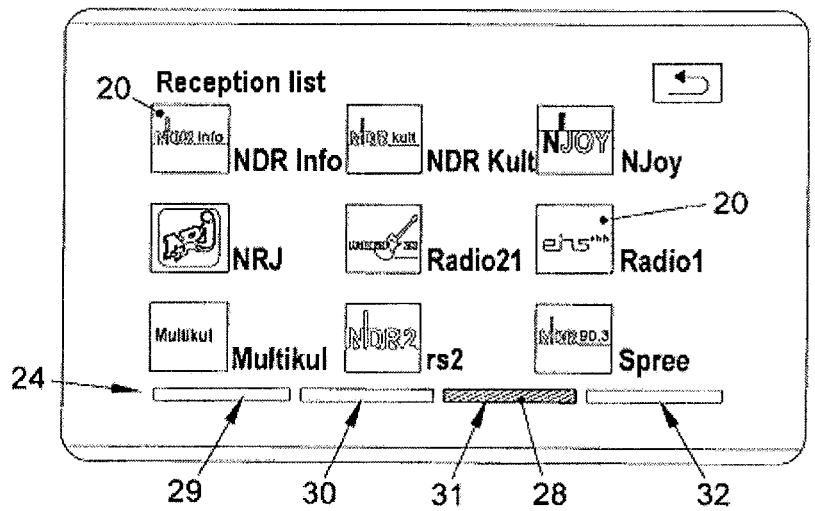

FIGS. 20 to 24 show a further example of the third disclosed embodiment of the method:

In this example, the graphical objects 20 are displayed not on a linear, one-dimensional strip 21 but rather, as shown in FIG. 20, in a two-dimensional grid. In this case, the total set of graphical objects 20 for the radio stations comprises a total of twenty-seven graphical objects 20. These twenty-seven graphical objects 20 are divided into four subsets with nine graphical objects 20 each. Accordingly, the strip 24 comprises four segments 29 to 32. As explained above, the marker 28 is displayed on the strip 24. As shown in FIGS. 20 to 24, the user can use the input device to displace the displayed subset from the first nine graphical objects 20 for the radio stations to the third nine graphical objects 20 for the radio stations by displacing the marker 28 on the strip 24, for example. As explained above, the marker 28 can be displaced essentially smoothly. Following the conclusion of the operator control process, the marker 28 and accordingly the displayed graphical objects 20 are moved in an animation such that a subset with nine graphical objects 20 that has been stipulated in advance is displayed.

It is pointed out that not only in the first disclosed embodiment of the method but also in the second and/or third disclosed embodiments of the method, the speed of the vehicle which is transmitted to the control apparatus 3 by the measuring apparatus 7, can have an influence on the speed of the animations of the graphical objects. In particular, it is possible that animations proceed more quickly at higher vehicle speeds than at low vehicle speeds. The reason is that, in particular, at higher vehicle speeds the driver looks at the display panel 2 without interruption only for a shorter period that at slower vehicle speeds. The effect which can be achieved by this adaptation to suit the vehicle speed is, therefore, that the driver perceives the same path of movement for the animation regardless of the vehicle speed. This makes it easier for the driver to orient himself when the display content alters and to quickly and intuitively grasp the altered information content. The parameters of the animations for the presentation of the information can, therefore, be a feature of the method and the apparatus which can be implemented as an option. When these parameters are determined, particular account is taken of how a driver of a vehicle can grasp information particularly effectively while in transit.

LIST OF REFERENCE SYMBOLS

1 Display device
2 Display panel
3 Control apparatus
4 System clock
5 Memory
6 Data bus
7 Measuring apparatus for the vehicle speed
10 Graphical objects
11 Alphanumeric label
20 Graphical objects
21 Label
22 Display element
23 Display element
24 Strip
25 Segment of the strip 24
26 Segment of the strip 24
27 Segment of the strip 24
28 Marker
29 Segment of the strip 24
30 Segment of the strip 24
31 Segment of the strip 24
32 Segment of the strip 24

The invention claimed is:

1. A method for providing a user interface in a vehicle, the method comprising:
   determining a current speed of the vehicle;
   displaying a subset of a set having a large number of objects can be by a display device, wherein the objects are divided into n disjunction subsets, where n is a natural number which is greater than 2;
   displaying a graphical element via the display device, wherein the graphical element represents which subset is currently displayed by virtue of a relative position of a first graphical sub-element in relation to a second graphical sub-element; and
   altering the displayed subset in response to an operator control process wherein n positions are defined relative to the second graphical sub-element, and the first graphical sub-element is displayed only at one of these n positions if no operator control process for altering the subset is performed,
   wherein the positioning of the first graphical sub-element on one of the n positions is relative to the second graphical sub-element, the positioning representing which of the n subsets is currently being displayed on the display device, and
   wherein the position of the first graphical sub-element is changed at the conclusion of the operator control process in response to performance of the operator control process for altering the subset using an animation that provides a visual transition, wherein the animation visually displays transitions between various display modes by virtue of movement of graphical objects, wherein the speed of the animation is a function of the determined vehicle speed, wherein at least one dimension of the first graphical sub-element relative to that dimension of the second graphical sub-element in at least one direction represents the number of objects in the currently displayed subset relative to the total number of objects in the set.

2. The method of claim 1, wherein the first graphical sub-element is displaced smoothly relative to the second graphical sub-element in response to the operator control process input via an input device, and wherein, following completion of the operator control process, the first graphical sub-element is automatically displayed on a particular position from the n positions based on a position of the first graphical sub-element at the completion of the operator control process.

3. The method of claim 1, wherein the second graphical sub-element is divided into n segments.

4. The method of claim 3, wherein at least one dimension of the first graphical sub-element corresponds to the at least one dimension of a segment of the n segments of the second graphical sub-element.

5. The method of claim 3, wherein the first graphical sub-element is presented at one of the n positions in a form superimposed on a segment of the n segments.

6. The method of claim 3, wherein the n segments are in the form of buttons, and wherein the method further comprises receiving an indication of an operation of at least one of the buttons, wherein the operation indication indicates an operator's selection of the subset of the objects that is to be displayed on the display device, wherein, the alteration of the subset is performed as a result of selection of a segment of the n segments of the second graphical sub-element and prompts performance of an animation in which the first graphical sub-element is moved to the relevant position from the n positions on the display device.

7. The method of claim 1, wherein the animation relates to movements by individual graphical objects in a particular display mode or to the movement of a graphical object from a first presentation in a display mode to a second presentation.

8. The method of claim 7, wherein the animation is a key image animation, in which frames between two key images of an animation are displayed to give the impression of a fluid alteration.

9. The method of claim 1, wherein the animation visually displays transitions between various display modes by virtue of movement of graphical objects.

10. An apparatus for displaying subsets of a set having a large number of objects by a display device in a vehicle, wherein the objects are divided into n disjunct subsets, where n is a natural number which is greater than 2, the apparatus comprising:
  a user interface including: a display device; and
  a control apparatus that controls display on the display device, wherein the control apparatus controls display of a subset of the set having a large number of objects and to display a graphical element which represents which subset is currently displayed by a relative position of a first graphical sub-element in relation to a second graphical sub-element; and
  an input device that receives input from an operator to select an operator control process which alters the subset displayed on the display device,
  wherein the objects are divided into n disjunct subsets, where n is a natural number which is greater than 2, and the control apparatus controls display on the display device such that n positions are defined relative to the second graphical sub-element, and the first graphical sub-element is displayed only at one of these n positions if selection of no operator control process for altering the subset is received via the input device, wherein positioning of the first graphical sub-element on one of the n positions relative to the second graphical sub-element represents which of the n subsets is currently displayed on the display device, and
  wherein the position of the first graphical sub-element is changed at the conclusion of the operator control process in response to performance of the operator control process for altering the subset using an animation that provides a visual transition, wherein the speed of the animation is a function of a determined current vehicle speed, wherein the animation visually displays transitions between various display modes by virtue of movement of graphical objects, wherein the second graphical sub-element is divided into n segments; wherein the first graphical sub-element is present at two of the n positions during transitions between the various display modes.

11. The apparatus of claim 10, wherein the input device comprises a touch-sensitive surface provided on a surface panel of the display device.

12. The apparatus of claim 10, wherein the first graphical sub-element is displaced smoothly relative to the second graphical sub-element in response to the operator control process input via the input device, and wherein, following completion of the operator control process, the first graphical sub-element is automatically displayed on a particular position from the n positions based on a position of the first graphical sub-element at the completion of the operator control process.

13. The apparatus of claim 10, wherein at least one dimension of the first graphical sub-element relative to that dimension of the second graphical sub-element in at least one direction represents the number of objects in the currently displayed subset relative to the total number of objects in the set.

14. The apparatus of claim 10, wherein the at least one dimension of the first graphical sub-element corresponds to the at least one dimension of a segment of the n segments of the second graphical sub-element.

15. The apparatus of claim 10, wherein the first graphical sub-element is presented at one of the n positions in a form superimposed on a segment of the n segments.

16. The apparatus of claim 10, wherein the n segments are in the form of buttons, and wherein the method further comprises receiving an indication of an operation of at least one of the buttons, wherein the operation indication indicates an operator's selection of the subset of the objects that is to be displayed on the display device, wherein, the alteration of the subset is performed as a result of selection of a segment of the n segments of the second graphical sub-element and prompts performance of an animation in which the first graphical sub-element is moved to the relevant position from the n positions on the display device.

17. The apparatus of claim 10, wherein the animation relates to movements by individual graphical objects in a particular display mode or to the movement of a graphical object from a first presentation in a display mode to a second presentation.

18. The apparatus of claim 17, wherein the animation is a key image animation, in which frames between two key images of an animation are displayed to give the impression of a fluid alteration.

19. The apparatus of claim 10, wherein the animation visually displays transitions between various display modes by virtue of movement of graphical objects.

20. A vehicle comprising:
  an apparatus for displaying subsets of a set having a large number of objects by a display device, wherein the objects are divided into n disjunct subsets, where n is a natural number which is greater than 2, the apparatus comprising:
a user interface including:
a display device; and
a control apparatus that controls display on the display device, wherein the control apparatus controls display of a subset of the set having a large number of objects and to display a graphical element which represents which subset is currently displayed by a relative position of a first graphical sub-element in relation to a second graphical sub-element; and
an input device that receives input from an operator to select an operator control process which alters the subset displayed on the display device,
wherein the control apparatus controls display on the display device such that n positions are defined relative to the second graphical sub-element, and the first graphical sub-element is displayed only at one of these n positions if selection of no operator control process for altering the subset is received via the input device, and
wherein positioning of the first graphical sub-element on one of the n positions is relative to the second graphical sub-element, the positioning representing which of the n subsets is currently displayed on the display device, and
wherein the position of the first graphical sub-element is changed at the conclusion of the operator control process in response to performance of the operator control process for altering the subset using an animation that provides a visual transition, wherein the speed of the animation is a function of a determined current vehicle speed, wherein the animation visually displays transitions between various display modes by virtue of movement of graphical objects,.
wherein the second graphical sub-element is divided into n segments; wherein the first graphical sub-element is present at two of the n positions during transitions between the various display modes.

21. The vehicle of claim 20, wherein the input device comprises a touch-sensitive surface provided on a surface panel of the device apparatus.

22. The vehicle of claim 20, wherein the first graphical sub-element is displaced smoothly relative to the second graphical sub-element in response to the operator control process input via the input device, and
wherein, following completion of the operator control process, the first graphical sub-element is automatically displayed on a particular position from the n positions based on a position of the first graphical sub-element at the completion of the operator control process.

23. The vehicle of claim 20, wherein at least one dimension of the first graphical sub-element relative to that dimension of the second graphical sub-element in at least one direction represents the number of objects in the currently displayed subset relative to the total number of objects in the set.

24. The vehicle of claim 20, wherein the second graphical sub-element is divided into n segments.

25. The vehicle of claim 24, wherein the animation visually displays transitions between various display modes by virtue of movement of graphical objects.

26. The vehicle of claim 20, wherein the animation relates to movements by individual graphical objects in a particular display mode or to the movement of a graphical object from a first presentation in a display mode to a second presentation.

27. The vehicle of claim 26, wherein the animation is a key image animation, in which frames between two key images of an animation are displayed to give the impression of a fluid alteration.

28. A method for providing a user interface in a vehicle, the method comprising:
displaying a subset of a set having a large number of objects on a display device by a control apparatus displaying a graphical element via the display device, wherein the graphical element represents which subset is currently displayed by virtue of a relative position of a first graphical sub-element in relation to a second graphical sub-element which is a strip altering the displayed subset in response to an operator control process,
wherein n positions are defined relative to the second graphic sub-element, and the first graphical sub-element is displayed only at one of these n positions if no operator control process for altering the subset is performed,
wherein the positioning of the first graphical sub-element on one of the n positions represents which of the n subsets is currently being displayed on the display device,
wherein, during an operator control process, a wiping gesture is sensed in a direction on a touch-sensitive surface on the display device, the first graphical sub-element is displayed moving smoothly in a direction opposite the wiping gesture in relation to the second graphical sub-element in response to the operator control process following completion of the operator control process, wherein the first graphical sub-element is present at two of the n positions during an operator control process,
wherein the first graphical sub-element is automatically displayed on a particular position from the n positions based on a position of the first graphical sub-element at the completion of the operator control process so that the first graphical sub-element is displayed on a particular position of the n positions in relation to the second graphical sub-element, wherein the movement is performed after conclusion of the operator control process such that the objects are moved in the direction of the wiping gesture until the appropriate subset is displayed, wherein the speed of the movement is a function of a determined current vehicle speed.

* * * * *